United States Patent
Riemens et al.

(10) Patent No.: US 7,262,807 B2
(45) Date of Patent: Aug. 28, 2007

(54) SIGNAL PROCESSING DEVICE FOR PROVIDING MULTIPLE OUTPUT IMAGES IN ONE PASS

(75) Inventors: Abraham Karel Riemens, Eindhoven (NL); Kornelis Antonius Vissers, Sunnyvale, CA (US); Robert Jan Schutten, Campbell, CA (US)

(73) Assignee: Koninklijke Philips Electronics N.V., Eindhoven (NL)

( * ) Notice: Subject to any disclaimer, the term of this patent is extended or adjusted under 35 U.S.C. 154(b) by 434 days.

(21) Appl. No.: 10/495,947

(22) PCT Filed: Oct. 28, 2002

(86) PCT No.: PCT/IB02/04535

§ 371 (c)(1),
(2), (4) Date: May 18, 2004

(87) PCT Pub. No.: WO03/045055

PCT Pub. Date: May 30, 2003

(65) Prior Publication Data

US 2005/0018076 A1    Jan. 27, 2005

(30) Foreign Application Priority Data

Nov. 23, 2001    (EP)    ................................. 01204528

(51) Int. Cl.
*H04N 7/01*    (2006.01)
*H04N 11/20*    (2006.01)

(52) U.S. Cl. ...................... 348/441; 348/446; 348/448; 348/452

(58) Field of Classification Search ................ 348/448, 348/441, 452, 458, 446, 554, 555, 556; H04N 7/01, H04N 11/20
See application file for complete search history.

(56) References Cited

U.S. PATENT DOCUMENTS

| | | | | |
|---|---|---|---|---|
| 5,943,099 | A | * | 8/1999 | Kim ............................ 348/448 |
| 6,034,734 | A | * | 3/2000 | De Haan et al. ............. 348/458 |
| 6,859,235 | B2 | * | 2/2005 | Walters ....................... 348/448 |
| 7,098,957 | B2 | * | 8/2006 | Kim et al. ................... 348/452 |
| 2003/0052995 | A1 | * | 3/2003 | Hsu et al. .................... 348/448 |

* cited by examiner

*Primary Examiner*—Trang U. Tran

(57) ABSTRACT

Signal processing device for providing multiple output images by processing input images of an interlaced video signal, comprising a temporal interpolater circuit (18) and a memory buffer (26, 27) connected to the temporal interpolater circuit. The memory buffer (26, 27) is arranged for storing at least part of a previous input image (11, 13) and a current input image (12). The temporal interpolater circuit (18) is arranged for receiving at least the previous and current input image from the memory buffer (26, 27) and for providing multiple interlaced or de-interlaced frame data (15) at temporal positions between the previous input image temporal position and the current input image temporal position.

15 Claims, 3 Drawing Sheets

SIGNAL PROCESSING DEVICE FOR PROVIDING MULTIPLE OUTPUT IMAGES IN ONE PASS

The present invention relates to a signal processing device for providing multiple output images by processing input images of an interlaced video signal, comprising a temporal interpolater circuit and a memory buffer connected to the temporal interpolater circuit. Such a signal processing device may be applied in motion compensated scan rate conversion of interlaced video signals in video or in film (movie) mode.

American patent U.S. Pat. No. 6,041,078 describes a method for simplifying bit matched motion estimation. The performance requirements for part of the motion estimation method, i.e. the block matching step (calculating sum of absolute differences for a pixel block of the reference frame and a search block of a previous frame), are simplified by first converting the multi-bit pixel values of the frames to single bit pixel values. This greatly reduces the calculations, which are necessary for the block matching step of the motion estimation method. It also reduces the bandwidth requirement for retrieving the previous frame search area for comparison with every image block of the reference frame. As a result, a system is provided having higher performance or delivering higher quality images.

However, in the above described method image information is left out before important image processing steps, and consequently the image quality may be adversely affected.

The present invention seeks to provide a method and system for motion compensated scan rate conversion of interlaced video signals in either video mode or film (movie) mode, which have an improved efficiency over prior art systems.

The present invention thus provides a signal processing device of the type as defined in the preamble above, in which the memory buffer is arranged for storing at least part of the previous input image and the current input image, the temporal interpolater circuit being arranged for receiving at least the previous and current input image from the memory buffer and for providing multiple interlaced or de-interlaced frame data at temporal positions between the previous input image temporal position and the current input image temporal position.

In the memory buffer, a complete input image may be stored, or only part of an input image. The present signal processing device allows to generate multiple output images at temporal positions between a previous input image and a current input image, using the data stored in the memory buffer. It is thus not necessary to load the data requested for the temporal interpolation each time when an output image is generated. Temporal interpolation is a technique well known in the art, and the person skilled in the art may be well known with various implementation schemes for such a function. Many known interpolation techniques require both the motion compensated image pixels and the non-motion compensated image pixels of the previous and the current image.

In a further embodiment, the signal processing device further comprises a de-interlace circuit connected to the memory buffer, the de-interlace circuit being arranged for receiving at least the previous image and the current image from the memory buffer and providing progressive image data at the temporal position of the current image, the temporal interpolation circuit receiving the progressive image data from the de-interlace circuit as current input image. The output from the de-interlace circuit may be fed to the temporal interpolation circuit directly or indirectly (using intermediate storage means). De-interlacing is a technique well known in the art, and the person skilled in the art may be well known with various implementation schemes for such a function. As the output of the de-interlace circuit is used by the temporal interpolation circuit as current input image, no additional memory area is needed for that data. This embodiment of the present invention thus provides for a signal processing device requiring less memory space. When the signal processing device is implemented as a silicon chip, this results in a lower silicon area requirement.

In operation the signal processing device according to the embodiments described above is activated once for every desired output image and once for every input image. Thus, no improvement is reached with respect to the bandwidth requirement of the data highway. Therefore, in a further embodiment, the signal processing device further comprises a local buffer for storing recursive data, the recursive data being output by the de-interlace circuit and the temporal interpolation circuit being further arranged to retrieve the recursive data from the local buffer and using this data as non motion compensated data. As a theoretical minimum, the local buffer is arranged to store a 2×2 pixel block in case the motion vectors are valid for such a 2×2 pixel block. As the recursive data output by the de-interlace circuit for a certain position in the image is identical to the non motion compensated data required for the temporal interpolation circuit, these data can be reused, obviating the need to retrieve these data again from the storage memory and avoiding de-interlacing the same data again. In this embodiment, the bandwidth required for the data highway is thus reduced.

In a further embodiment, the temporal interpolation circuit is operated in a multiplexed manner. Multiple input image sequences (e.g. luminance and chrominance signals or two different video signals) may be processed image by image.

Also, the de-interlace circuit and the temporal interpolation circuit may both be operated in a multiplexed manner, the de-interlace circuit being executed to obtain a recursive output at the temporal location of the input image, and the de-interlace circuit and temporal interpolation circuit being executed to obtain temporally interpolated output data using at least the recursive data from the local buffer. This embodiment allows to generate multiple output images for multiple input image streams using the same input data received by the signal processing device.

The previous image may be a progressive image as obtained in a previous run of the signal processing device. Certain implementations of the de-interlace circuit function apply a recursive algorithm, requiring a progressive previous input image in stead of an interlaced previous input image. As an alternative, when the recursive output image is not actually needed, the output thereof may be disabled. In this case, the memory buffer is filled with the previous input image and the current input image, and the recursive de-interlacer is replaced by a transversal de-interlacer. Although image quality may degrade in this case, significant savings are obtained in bandwidth requirements. Overall, the possibility of disabling the recursive output provides a system having bandwidth scalability with graceful degradation.

The memory buffer is preferably arranged to store image data comprising at least one image block, e.g. a 8×8 pixel block, and surrounding image area that is accessible over a motion vector for at least the previous image and the current image. The memory buffer may be implemented as separate physical memories for the previous image and for the current image allowing easier memory access by the other signal processing device circuits.

The present invention may be advantageously applied for an input image rate to output image rate conversion for the temporal interpolation circuit which is one of the group of 24 Hz to 60 Hz; 25 Hz to 50 Hz; 25 Hz to 100 Hz; 50 Hz to 100 Hz. These are commonly used conversions, e.g. in TV systems. Also, other applications exist, such as 30 personal computers, in which video signals may be input (50 Hz interlaced, 25 Hz progressive/60 Hz interlaced, 24 Hz progressive) and output to a computer screen operating at any of the frequencies 60 Hz, 72 Hz, 85 Hz progressive.

In a further embodiment, the signal processing device further comprises a temporal noise reduction circuit, receiving data from the de-interlace circuit and the memory buffer, for providing an output with motion compensated temporal noise reduction. As this temporal noise reduction circuit is included down stream of the de-interlace circuit, no additional data highway bandwidth is consumed.

In a comparable manner, the signal processing device may further comprise a vertical filtering circuit, receiving data from the temporal interpolation circuit for providing an output with a vertical bandwidth limited interlaced signal or an output with scaled vertical dimension. This vertical filtering circuit allows e.g. to change sampling grid of video signal, again without further additional requirement for the data highway bandwidth.

In an even further embodiment of the present invention, the interlaced video signal may comprise luminance data and/or chrominance data, and the signal processing device is being operated sequentially on the luminance and/or chrominance data for every image. For operation, the signal processing device is then activated twice, once for a luminance data processing and once for chrominance data processing. This allows to perform a motion compensation function on the input video signal, both for the luminance and the chrominance part of the video signal, using only a single piece of hardware, reusing the same on chip logic and buffers.

The signal processing device according to the present invention may be complemented with a motion estimation circuit for calculating motion vectors using the previous and current input image. Using the previous and current input image, and earlier stored motion vectors, the motion estimation circuit is capable of calculating new motion vectors. This way, the present device may either perform motion estimation or motion compensation with re-use of the same on chip buffers and part of the logic (addressing and loading of image data from a background memory).

Using such a device for processing of input data, may include using a first run to determine motion vectors, a second run for processing the luminance signal and a third run for processing a chrominance signal, the first run being performed before the second and third run for calculating the desired output images. This is a very efficient coarse grain multiplexed manner of operating the present device.

Also, the present device may be used for processing multiple input data streams, by executing a cycle of the device for each image of each of the input data streams in a time-multiplexed manner. As the device can run a single cycle without any state in between cycles, it is possible to process multiple data streams. E.g., in one field time, 6 cycles may be performed using the present device: Motion estimation—stream 1; Motion compensation luminance—stream 1; Motion compensation chrominance—stream 1; Motion estimation—stream 2; Motion compensation luminance—stream 2; Motion compensation chrominance—stream 2. The only constraints are that the motion estimation is performed before the motion compensation of associated images.

The present invention will now be explained in further detail using a number of exemplary embodiments of the invention, with reference to the accompanying drawings, in which FIG. 1 shows in a schematic diagram various input and output images as used in the present invention;

Figure 1:
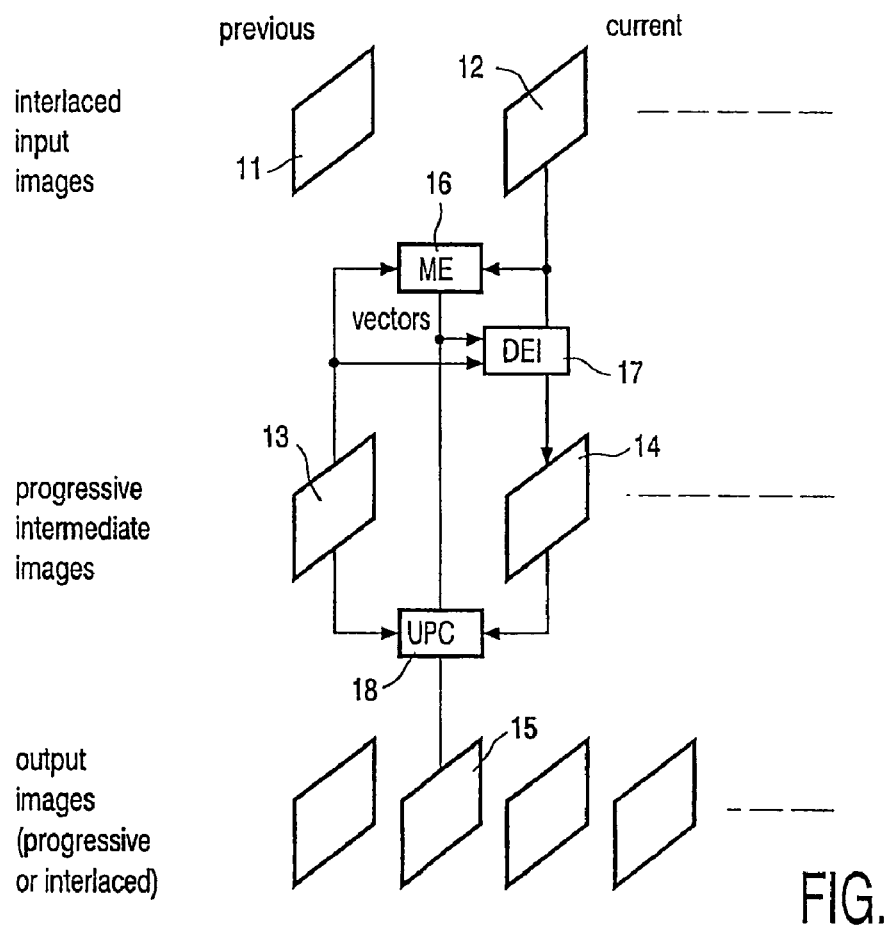

In FIG. 1 the various images and functional blocks are shown in their context. The input signal for the present method and system are interlaced input images, such as the previous input image 11 and current input image 12 shown in the top of the figure. The previous input image 11 and current input image 12 comprise the image information of one image field, respectively, being the odd or even lines of a video image. In the middle part, progressive intermediate images are shown, which comprise a progressive previous image 13 and progressive current image 14. The progressive intermediate images comprise image information of all lines of a video image or frame (non-interlaced). An important function is executed by the motion estimator (ME) 16. The motion estimator 16 calculates motion vectors, using a previous image and a current image. In the embodiment shown, the motion estimator uses the progressive previous image 13 and the current input image 12 to produce motion vectors. The motion estimation function is a method well understood by the person skilled in the art, and needs no further explanation in view of the present invention. Reference can e.g. be made to the article 'IC for motion-compensated de-interlacing, noise reduction and picture rate conversion' by G. de Haan, IEEE Transactions on Consumer Electronics, Vol. 45, no. 3, Aug. 1999.

A de-interlacing function (DEI) 17 converts the interlaced image 12 into a progressive image 14. E.g. a 50 Hz interlaced signal (comprising 50 fields per second, each containing only the even or only the odd lines of an image) is converted into a 50 Hz progressive signal (comprising frames having all lines of an image). The de-interlacing function 17 uses the same images for input as the motion estimator 16, and also uses the motion vectors as output by the motion estimator 16. De-interlacing is a recursive function, and uses the earlier calculated progressive previous image 13 which is the progressive current image output of the de-interlace operation on the previous image.

A temporal interpolation function 18 (also called upconversion, UPC) uses the two intermediate images 13, 14 and the motion vectors to calculate a temporal interpolated image 15. A major application for this function is e.g. the conversion of a 50 Hz video signal into a 100 Hz video signal.

Figure 2:
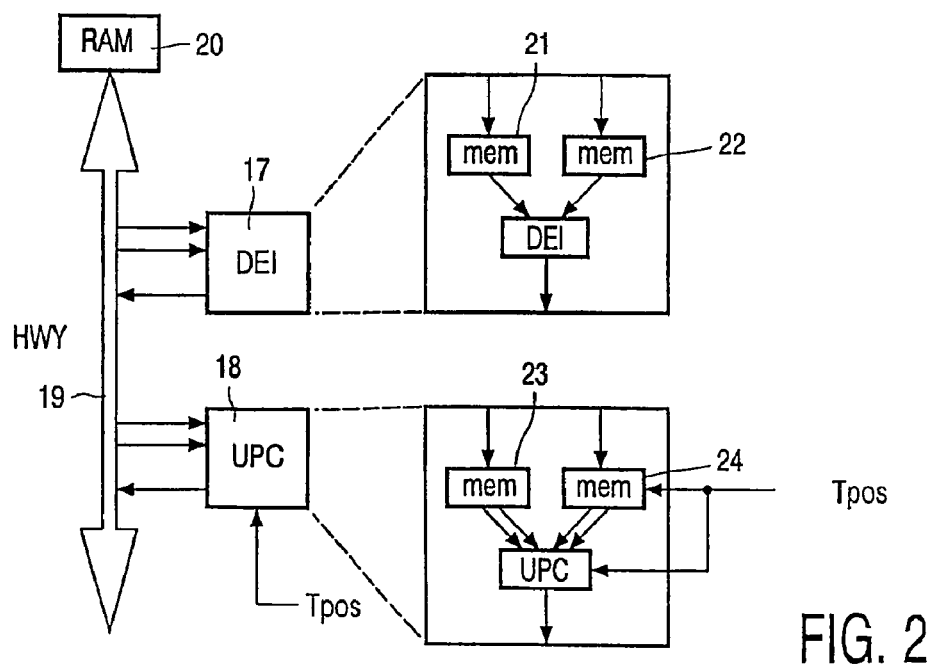
FIG. 2 shows a schematic diagram of an implementation of a motion compensation function for realizing de-interlaced images and temporal interpolated images.

In FIG. 2 a straightforward implementation is shown of a motion compensation function based on a system concept, with shared memory that is used by multiple functions.

The system performs synchronization on an image-by-image basis, such that a complete image frame time (typically 20 ms) is available to perform the necessary calculations, in whichever order one chooses. In a memory 20 (e.g.

a random access memory RAM) all image memories are stored. Also, the motion vectors as calculated by the motion estimator 16 are stored in this memory 20. A data highway 19 (HWY) is a central system bus, enabling all communication between the memory 20 and the other functional circuits or blocks 17, 18.

For the person skilled in the art, it will be clear that the present device is a part of a larger system, which may comprise a processor unit (not shown) connected to the data highway 19 for controlling the device and managing the data flows to and from the memory 20. The de-interlace circuit 17 receives multiple images as input (typical the previous de-interlaced image 13 and the current input image 12, but it is also possible to add the next image (not shown), and outputs a progressive image 14 at the temporal position of the current input image 12. The exploded view of the de-interlace circuit 17 shows the local search areas 21, 22 (mem), one for each of the input images 12, 13. These search areas may be implemented as memory buffers, and each search area comprises a copy of a part of an input image 12, 13, to facilitate full random access at very high bandwidths. The necessary motion compensated data can thus be accessed.

Figure 3:
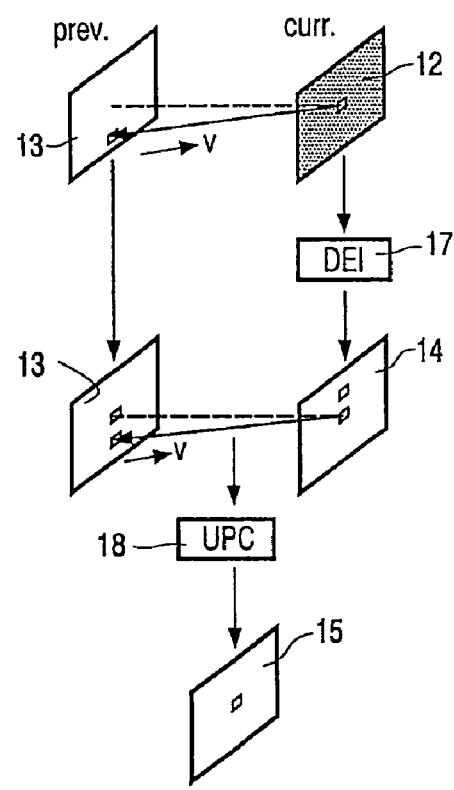
FIG. 3 shows the various input and output images associated with the system of FIG. 2.

In the top of FIG. 3 the images are shown used by the de-interlacing circuit 17. Data from the current input image 12 and the previous input image 13 are required. The previous input image 13 may be accessed via the motion vector $\vec{v}$.

Returning to FIG. 2, the up-converter circuit 18 is shown with control value Tpos. Input for the up-converter circuit 18 are two progressive images 13, 14, and output is a temporal interpolated image 15 at Tpos. Tpos indicates the temporal position of the output image 15 relative to the two input images 13, 14. The exploded view of the up-converter circuit 18 shows similar local search areas 23, 24 as in the de-interlacing circuit 17. The data access is different. Most commonly known up-converter algorithms use both motion compensated and non-motion compensated data from both input images 13, 14. In FIG. 3 the input data for the up-converter circuit 18 is shown. First the motion vector $\vec{v}$ is split according to the temporal position Tpos. The motion compensated data from both the previous progressive image 13 as the current progressive image 14 are used. Also, the non motion compensated data of both images 13, 14 are used.

For each input image 13, 12 there is one search area. Each search area comprises at least one current block (typical an 8×8 pixel counted in frame grid) with all surrounding image data that can be accessed using the maximum vector range. In the system shown in FIG. 2, first the de-interlacing circuit 17 is activated. This results in the intermediate progressive image 14, which is stored in memory 20. It is used for the recursive de-interlace loop and as an input for the upconversion circuit 18. After the de-interlacing is finished, the upconversion circuit 18 is activated for each output image 15 that is required.

In table 1 a calculation of the bandwidth of the data highway 19 is given. This table is valid for the conversion of a 50 Hz interlaced input to a 100 Hz interlaced output.

TABLE 1

|  | bandwidth |
| --- | --- |
| DEI input (previous progressive and current interlaced) | 3 |
| DEI output (progressive) | 2 |

TABLE 1-continued

|  | bandwidth |
| --- | --- |
| UPC input (previous and current progressive) | 4 |
| UPC output (interlaced; 1$^{st}$ image) | 1 |
| UPC input (previous and current progressive) | 4 |
| UPC output (interlaced; 2$^{nd}$ image) | 1 |
| Total for standard definition (20 Mbyte/s actual image data) | 15 × 20 = 300 Mbyte/s |

It is thus seen that implementation of the de-interlacing function and upconversion function as separate circuits causes an excessive bandwidth requirement of the highway 19.

Figure 4:
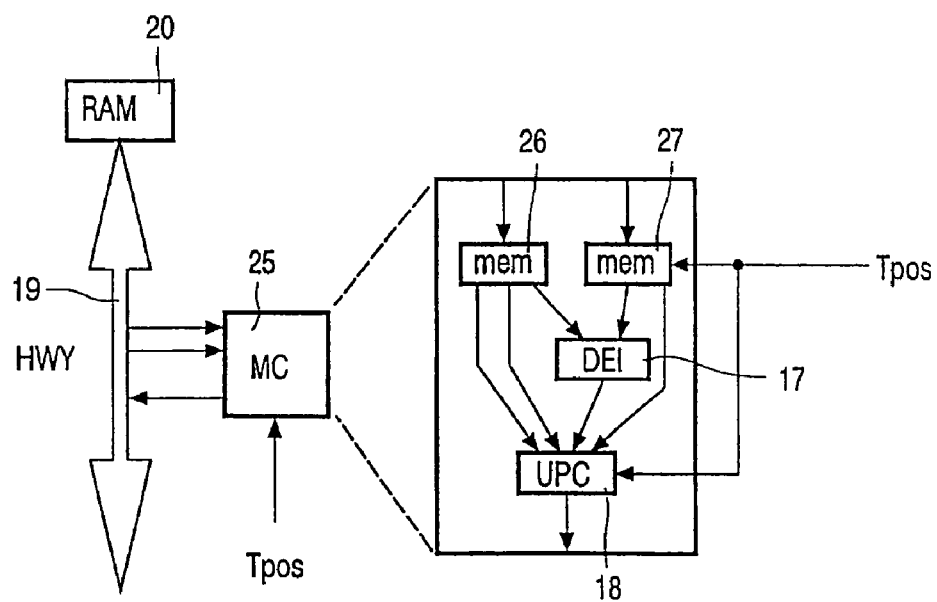
FIG. 4 shows a schematic diagram of a first embodiment of the present invention.

In a first embodiment of the present invention as shown in FIG. 4, the device uses only a single motion compensation block 25 as signal processing device, communicating with the memory 20 via the highway 19. The motion compensation block 25 comprises the de-interlacing circuit 17 and the upconversion circuit 18. However, in this embodiment the output data from the de-interlacing circuit 1.7 is passed directly to the upconversion circuit 18. This allows to have only two search areas (mem) 26, 27 for storing the previous progressive image 13 and current input image 12.

This embodiment has the advantage over the earlier described system, that less buffer or memory space is needed for the motion compensation block 25. This will result in a smaller silicon area necessary for the hardware implementation of the motion compensation block 25.

However, the motion compensation block 25 will need to be activated once for every output image 15. In order to allow the recursive de-interlacing function, the hardware block will also need to be executed for every input image 12 (with Tpos at the current image, value 1). As typical input to output image rates are 24→60; 25→50; 25→100 and 50→100, the motion compensation block 25 will have to be activated multiple times of the same input images 12. Calculation of the bandwidth requirements for the embodiment of FIG. 4 yields the results as shown in Table 2. It is clear that this embodiment does not result in any bandwidth savings.

TABLE 2

|  | bandwidth |
| --- | --- |
| recursive input (previous progressive and current interlaced) | 3 |
| recursive output (progressive) | 2 |
| Image 1 input (previous and current progressive) | 4 |
| Image 1 output (interlaced; 1$^{st}$ image) | 1 |
| Image 2 input (previous and current progressive) | 4 |
| Image 2 output (interlaced; 2$^{nd}$ image) | 1 |
| Total for standard definition (20 Mbyte/s actual image data) | 15 × 20 = 300 Mbyte/s |

Figure 5:
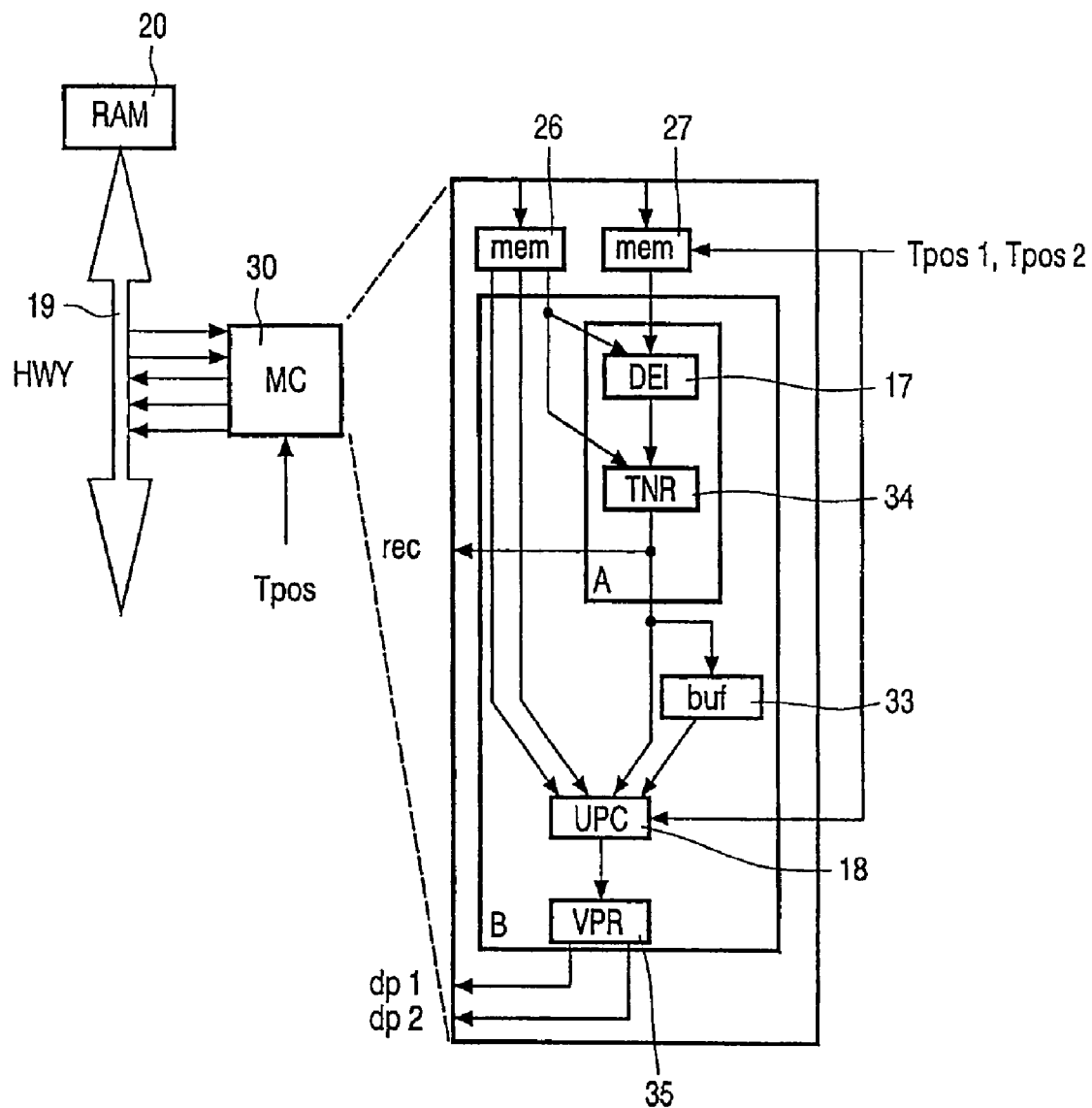
FIG. 5 shows a schematic diagram of a second embodiment of the present invention.

In a second embodiment according to the present invention which is shown diagrammatically in FIG. 5, parts of the circuits are reused and other parts are fine grain multiplexed, in such a way that multiple output images can be generated using the same input data. Again, the signal processing device in the form of the more extended motion compensation block 30 interfaces with the memory 20 via the highway 19. The local search areas (mem) (and their associated addressing logic) are reused for the de-interlacing function 17 and the upconversion function 18. The de-interlacing function 17 and upconversion function 18 are multiplexed. A remark need to be made that this multiplexing needs to be done at a data granularity which is smaller than or equal to the contents of the search area 26, 27.

Recursive algorithms, such as the de-interlacing function, require an output image at the same temporal position as the current input image 12. Sometimes the scan rate conversion function does not require this temporal position as a display output. Therefore, a specific recursive output image can be applied, resulting in a distinction between a recursive output image and one or more display outputs.

The data calculated for the recursive output image is identical to the non motion compensated data which is required for the up-conversion function. Thus, this data may be buffered and reused in the next stage of the multiplexing. This requires only a small buffer (theoretical minimum is a 2×2 pixel block when the motion vectors are valid for such a 2×2 pixel block).

In the exploded view of motion compensation block 25, it is clear that two search areas (mem) 26 and 27 are used to store the relevant data of the input images 13, 12, i.e. the current location with surrounding image area that is accessible over the motion vector. Once this data is loaded, the other parts of the motion compensation block may be activated multiple times to produce the current location of all required output images.

Only the part in the block with reference letter A is executed to calculate the recursive output image 14. The motion compensation block 25 comprises an additional local buffer 33, in which the calculated recursive image data is stored. For the recursive output image 14, the value of Tpos is forced at 1 (current image position).

For the calculation of the display outputs dp1, dp2, both parts A and B are executed, and the buffer 33 is only read. Having two display outputs dp1, dp2 (or display pipes) allows to obtain an output image rate which is once or twice the input image rate. When other factors are needed (3 or even 4) it will be apparent that the present device can be adapted to provide another multiplicity of display pipes, having different temporal positions.

Table 3 shows the bandwidth calculations for the embodiment of FIG. 5 in a comparable manner as in tables 1 and 2.

TABLE 3

|  | bandwidth |
|---|---|
| input (previous progressive and current interlaced) | 3 |
| Recursive output (progressive) | 2 |
| DP1 output (interlaced; 1st image) | 1 |
| DP2 output (interlaced; 2nd image) | 1 |
| Total for standard definition (20 Mbyte/s actual image data) | 7 × 20 = 140 Mbyte/s |

As can be seen from Table 3, the bandwidth savings is a factor of 300/140 for the theoretical minimum case.

The embodiment shown in FIG. 5 has the further advantage that additional processing can be added in the progressive domain without additional highway bandwidth consumption. Motion compensated temporal noise reduction 34 (TNR) is an example of such processing.

Also, the display outputs dp1, dp2 may have an additional postprocessing function, e.g. vertical filtering 35 (VPR) to output a vertical bandwidth limited interlaced signal from the progressive output of the upconversion function. The sampling grid may be changed using this function, since the display outputs dp1, dp2 are independent of the recursion loop. Also, the vertical filtering may be used to scale the image in the vertical direction.

The recursive output image may be disabled in certain applications. This saves additional bandwidth, as the recursive output image does not have to be stored in memory 20. In such an application, however, the previous memory buffer 26 will be filled using the previous input image instead of a previous recursive output image. In this case, the recursive de-interlace circuit will have to operate as a transversal de-interlace circuit, which will reduce the image quality. However, this embodiment allows a bandwidth scalability with graceful degradation of the image quality. Especially in a system with multiple functions utilizing the single shared background memory 20, this enhances the flexibility and application scope of the present device considerably.

The input video stream may be a multiplexed stream, such as a luminance and chrominance signal of the same image sequence. The present device 30 may then be used in a coarse grain multiplexing mode. The device is activated twice, once for the luminance data and once for the chrominance data. The advantage is that a single piece of hardware (device 30) can be used for handling both the luminance and chrominance signal very efficiently.

In a further embodiment, a motion estimation function may be added to the signal processing device 30, e.g. by introducing a motion estimation circuit 16. This allows to use a single piece of hardware either for performing motion estimation or motion compensation, reusing the same local onboard buffers. Of course, the motion estimation and motion compensation require different circuitry for implementation, but the addressing and loading of image data from the background memory 20 is similar. The motion estimation circuit 16 requires a previous and a current image and earlier calculated (and stored) motion vectors. As a result, new motion vectors are output.

In a coarse grain multiplexing mode, the present device 30 may thus operate in three cycles: motion estimation, motion compensation on luminance data and motion compensation on chrominance data. This may even be applied in a further multiplexing mode, in which different video signals are processed by the present signal processing device. Processing two data streams in one field time (typically 20 msec) then requires six activations (or cycles) of the device 30: ME-1, MC-Y-1, MC-UV-1, ME-2, MC-Y-2, MC-UV-2. The only constraint is that the motion estimation for a particular data stream occurs before the motion compensation for that data stream. This is possible as the device does not require any state between separate invocations (or cycles) of the device 30.

For the person skilled in the art, it will be clear that various modifications and amendments can be made without departing from the scope of the present invention. E.g., a third search area may be included in each of the embodiments to also allow inclusion of the next image in the de-interlacing and up-conversion calculations.

The invention claimed is:

1. Signal processing device for providing multiple output images by processing input images of an interlaced video signal, comprising a temporal interpolator circuit (18) and a memory buffer (26, 27) connected to the temporal interpolator circuit, characterized in that the memory buffer (26, 27) is arranged for storing at least part of a previous input image (11; 13) and a current input image (12), the temporal interpolator circuit (18) being arranged for receiving at least the previous and current input image from the memory buffer (26, 27) and for providing multiple interlaced or de-interlaced frame data (15) at temporal positions between the previous input image temporal position and the current input image temporal position.

2. Signal processing device according to claim 1, further comprising a de-interlace circuit (17) connected to the memory buffer (26, 27), the de-interlace circuit being arranged for receiving at least the previous image and the current image from the memory buffer (26, 27) and providing progressive image data (14) at the temporal position of the current image (12), the temporal interpolation circuit (18) receiving the progressive image data (14) from the de-interlace circuit (17) as current input image.

3. Signal processing device according to claim 2, in which the signal processing device further comprises a local buffer (33) for storing recursive data, the recursive data being output by the de-interlace circuit (17) and the temporal interpolation circuit (18) being further arranged to retrieve the recursive data from the local buffer (33).

4. Signal processing device according to claim 1, in which the temporal interpolation circuit (18) is operated in a multiplexed manner.

5. Signal processing device according to claim 3, in which the de-interlace circuit (17) and the temporal interpolation circuit (18) are operated in a multiplexed manner, the de-interlace circuit (17) being executed to obtain a recursive output at the temporal location of the current input image, and the de-interlace circuit (17) and temporal interpolation circuit (18) being executed to obtain multiple temporally interpolated output data using at least the recursive data from the local buffer (33).

6. Signal processing device according to claim 1, in which the previous input image (13) is a progressive image as obtained in a previous run of the signal processing device.

7. Signal processing device according to claim 5, in which the de-interlace circuit (17) is arranged to perform a transversal de-interlace function, using a previous input image (11) and current input image (12) of the video signal.

8. Signal processing device according to claim 1, in which the memory buffer (26, 27) is arranged to store image data comprising at least one image block, e.g. a 8×8 pixel block, and surrounding image area that is accessible over a motion vector for at least the previous image and the current image.

9. Signal processing device according to claim 1, in which the signal processing device further comprises a temporal noise reduction circuit (34), receiving data from the de-interlace circuit (17) and the memory buffer (26, 27), for providing an output with motion compensated temporal noise reduction.

10. Signal processing device according to claim 1, in which the signal processing device further comprises a vertical filtering circuit (35), receiving data from the temporal interpolation circuit (18) for providing an output with a vertical bandwidth limited interlaced signal or an output with scaled vertical dimension.

11. Signal processing device according to claim 1, in which the interlaced video signal comprises luminance data and/or chrominance data, and the signal processing device is being operated sequentially on the luminance and/or chrominance data for every image.

12. Signal processing device according to claim 1, further comprising a motion estimation circuit for calculating motion vectors using the previous and current input image.

13. Use of a device according to claim 12 for processing of input data, using a first run to determine motion vectors, a second run for processing the luminance signal and a third run for processing a chrominance signal, the first run being performed before the second and third run for calculating the desired output images.

14. Use of a device according to claim 1 for processing multiple input data streams, by executing a cycle of the device for each image of each of the input data streams in a time-multiplexed manner.

15. Apparatus, such as a TV, comprising a device according to claim 1.

* * * * *